(12) United States Patent
Balck

(10) Patent No.: US 6,278,881 B1
(45) Date of Patent: Aug. 21, 2001

(54) MOBILE COMMUNICATIONS SYSTEM

(75) Inventor: Kenneth Balck, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/106,363

(22) Filed: Jun. 29, 1998

(30) Foreign Application Priority Data

Jun. 30, 1997 (GB) .................................................. 9713805

(51) Int. Cl.[7] .................................................. H04Q 7/20
(52) U.S. Cl. .......................... 455/444; 455/443; 455/436
(58) Field of Search .................................. 455/444, 443, 455/434, 436, 437, 439, 446, 464; 379/59

(56) References Cited

U.S. PATENT DOCUMENTS

| | | | |
|---|---|---|---|
| 4,829,554 | * 5/1989 | Barnes et al. | 379/58 |
| 4,955,082 | 9/1990 | Hattori et al. | |
| 5,164,958 | * 11/1992 | Omura | 375/1 |
| 5,175,867 | * 12/1992 | Wejke et al. | 455/33.1 |
| 5,265,263 | 11/1993 | Ramsdale et al. | 455/33.2 |
| 5,289,525 | 2/1994 | Issenmann et al. | |
| 5,301,356 | * 4/1994 | Bodin et al. | 455/33.2 |
| 5,392,453 | * 2/1995 | Gudmundson et al. | 455/33.2 |
| 5,394,158 | 2/1995 | Chia | 342/457 |
| 5,581,548 | * 12/1996 | Ugland et al. | 370/330 |
| 5,594,943 | * 1/1997 | Balachandran | 455/33.2 |
| 5,640,677 | 6/1997 | Karlsson | 455/33.2 |
| 5,765,103 | * 6/1998 | Chang et al. | 455/434 |
| 5,822,696 | * 10/1998 | Bergkvist | 455/436 |

FOREIGN PATENT DOCUMENTS

| | | |
|---|---|---|
| 0 369 535 | 5/1990 | (EP) . |
| 0 526 436 | 2/1993 | (EP) . |
| 0 568 212 | 11/1993 | (EP) . |
| 0 660 632 | 6/1995 | (EP) . |
| 0 701 382 | 3/1996 | (EP) . |
| 0701382A1 | 3/1996 | (EP) .............................. H04Q/9/00 |
| 2 220 117 | 12/1989 | (GB) . |
| 07023449 | 1/1995 | (JP) . |
| 07046644 | 2/1995 | (JP) . |
| 07059145 | 3/1995 | (JP) . |
| 07067165 | 3/1995 | (JP) . |
| 07095648 | 4/1995 | (JP) . |
| 0888876 | 4/1996 | (JP) . |
| 08154269 | 6/1996 | (JP) . |
| 93/06663 | 4/1993 | (WO) . |
| 95/08896 | 3/1995 | (WO) . |
| 95/35006 | 12/1995 | (WO) . |
| 96/05708 | 2/1996 | (WO) . |
| 96/36190 | 11/1996 | (WO) . |

OTHER PUBLICATIONS

International Search Report dated Dec. 18, 1998.
Great Britain Patent Office Search Report dated Sep. 1, 1997.
Draft prETS 300 557: Nov. 1996 (GSM 04.08 Version 4.17.0 Sections 3.4.4–3.4.11.2) pp. 37–43.

* cited by examiner

*Primary Examiner*—Daniel Hunter
*Assistant Examiner*—C. Chow
(74) *Attorney, Agent, or Firm*—Burns, Doane, Swecker & Mathis, L.L.P.

(57) ABSTRACT

In a cellular communications network including microcells and macrocells, a mobile device preferably communicates with an appropriate one of the microcells. When a handover from one microcell to another is imminent, a backup channel in the macrocell layer is allocated to the mobile device, for use if the handover is not successfully completed.

20 Claims, 3 Drawing Sheets

MOBILE COMMUNICATIONS SYSTEM

TECHNICAL FIELD OF THE INVENTION

This invention relates to cellular mobile communications systems, and in particular to a method of managing a handover of a radio connection between two base stations in a network.

DESCRIPTION OF RELATED ART

A mobile telephone system includes a network of radio base stations, which can communicate with mobile devices which are active within the network. Each base station is able to communicate with mobile devices within a particular geographical area, called a cell.

A hierarchical cell structure groups the cells into layers, and typically includes a relatively large number of microcells, which are in a lower layer and each cover a relatively small geographical area, and a smaller number of macrocells, which are in a higher layer, and each cover a relatively large geographical area. In such a hierarchy, the lower layer cells are located such that they can communicate with mobile stations in those areas where the connection requirements are greatest, but there may be relatively large areas where there is no lower level cell. The upper layer cells then handle connections with mobile devices in these areas.

When a mobile device moves, it may be necessary for a connection with one base station to be handed over to another base station.

EP-0701382A discloses a hierarchical cell structure, with macrocells and microcells.

One widespread digital cellular system, GSM, defines its handover procedure, in Technical Specification GSM 04.08 section 3.4.4. The mobile station (MS) is ordered to switch to a channel in another cell by the air interface message HANDOVER COMMAND. The message contains a detailed description of the channel to switch to as well as other information such as the power to use when accessing the base station carrying this channel. The message may also include a time indication, expressed in the target cell time frame, when to access the new channel.

The HANDOVER COMMAND message is issued by the radio network control unit i.e. the BSC (Base Station Controller) via the base station of the serving cell. The typical reason for ordering a cell change is that the BSC has detected a better cell for the connection.

If the MS is unable to decode the HANDOVER COMMAND message, it will remain on the present channel until the subscriber hangs up, or another HANDOVER COMMAND message is successfully received, or radio link failure is detected, whichever happens first.

Radio link failure is detected on the MS side by the radio link counter S. If the MS is unable to decode a SACCH message, a counter S is decreased by 1. When the MS successfully decodes a SACCH message, S is increased by 2. In any case S shall not exceed the value of the parameter RADIO_LINK_TIMEOUT, which gives the initial value of counter S. If S reaches 0 a radio link failure will be declared and the MS will return to idle mode. The algorithm described above is often referred to as a "leaky bucket" algorithm.

If the HANDOVER COMMAND message is received properly, but the MS cannot establish on the new channel, then the MS will return to the first channel after some time, controlled by a timer. If the reestablishment on that channel also fails, a radio link failure will be detected and the MS will return to idle mode.

A problem arises with the use of this handover procedure, particularly in a hierarchical cell structure, in which the lower layer cells are quite small, and the over-lapping areas quite narrow. Near the cell border, the signal received from the serving base station drops very quickly. There is a substantial risk that the HANDOVER COMMAND message will not be received properly by the MS and the MS will remain on its present channel. Unless the MS reenters the serving cell, the MS will release the connection through its "leaky bucket" algorithm. The fact that the target cell, or indeed a higher level cell, could provide a high signal strength connection in the location of the MS at the time the HANDOVER COMMAND is sent will not be of any help. The MS is dependent on receiving a correct handover order from the serving base station.

SUMMARY OF THE INVENTION

The present invention seeks to provide a solution to this problem, by allocating a backup channel to a mobile station as it approaches the edge of a cell. Where the mobile device is communicating with a base station in a lower level cell, the backup channel can be in a higher level. If the mobile station fails to handover correctly to a new cell in the lower level, it can revert to the higher level backup channel. However, in the event that the handover is achieved correctly, the backup channel is not used, and the resources of the higher level cell are not occupied.

Aspects of the invention relate to methods of managing handover in a mobile communications system, to base stations for use in a mobile communications network, and to mobile devices for use in such a network.

An object of the invention, therefore, is to allow handovers to be achieved with a greater probability of success.

DETAILED DESCRIPTION OF PREFERRED EMBODIMENTS

Figure 1:
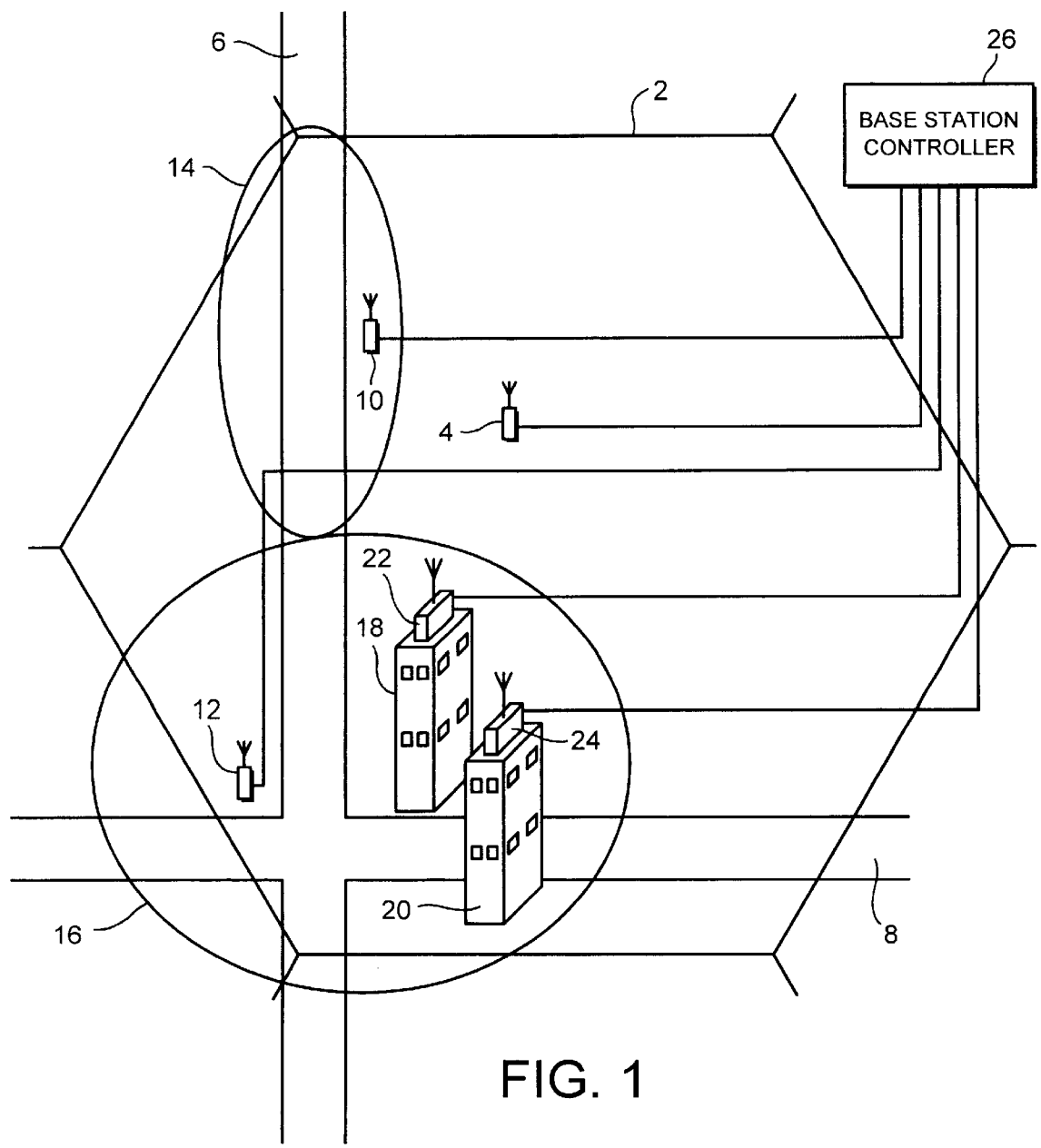
FIG. 1 is a schematic illustration of a part of a mobile communications network.

FIG. 1 represents a part of a cellular radio communications network having a hierarchical cell structure which includes three cell layers. The part of the network shown in FIG. 1 includes a single macrocell 2, which is served by a base station 4 having an antenna. In this illustrative example, two major roads 6, 8 pass through the macrocell 2, and it is expected that these areas will require a relatively high traffic capacity. The network therefore includes two further base stations 10, 12, serving respective microcells 14, 16 in the areas where high levels of cellular communication traffic are expected. Further, two tall buildings 18, 20 are located on the road 8, and these are expected to be sources of particularly high levels of cellular communications traffic. The network therefore includes two further base stations 22, 24, serving respective picocells, that is, cells in the lowest layer, in the respective buildings 18, 20, and in their respective immediate vicinities.

Each base station 4, 10, 12, 22, 24 is connected, for example via a respective land line, to a base station controller 26.

In general terms, it is advantageous for most of the traffic carrying capacity to be at the picocell level, and for most of the traffic to be handled by cells at this level, because this allows a more efficient usage of the available frequencies. However, only a relatively small part of the area of the cell may be covered by a picocell, and, when the mobile station is not within a picocell, the connection is most advantageously made with a microcell. Again, however, not all of the area of the macrocell will be covered by microcells and, when the mobile station is not within a microcell, the connection can be made with the macrocell.

The invention will now be described with reference to FIG. 2, which is a schematic diagram representing the signal strengths at certain points within the network, and FIG. 3, which is a flow chart showing as steps 100–104 the procedure carried out within a base station, and within the base station controller 26, and showing as steps 200–204 the procedure carried out within a mobile device. The following description assumes that a mobile device is travelling from one picocell into another picocell. As such, in the illustrated embodiment, where the picocells are restricted to individual buildings, this is perhaps most likely when the mobile device is being carried by a pedestrian. However, it will be appreciated that the invention is applicable to any situation where a mobile device is passing from one lower level cell to another lower level cell, in an area where there also exists a higher level cell.

Figure 2:
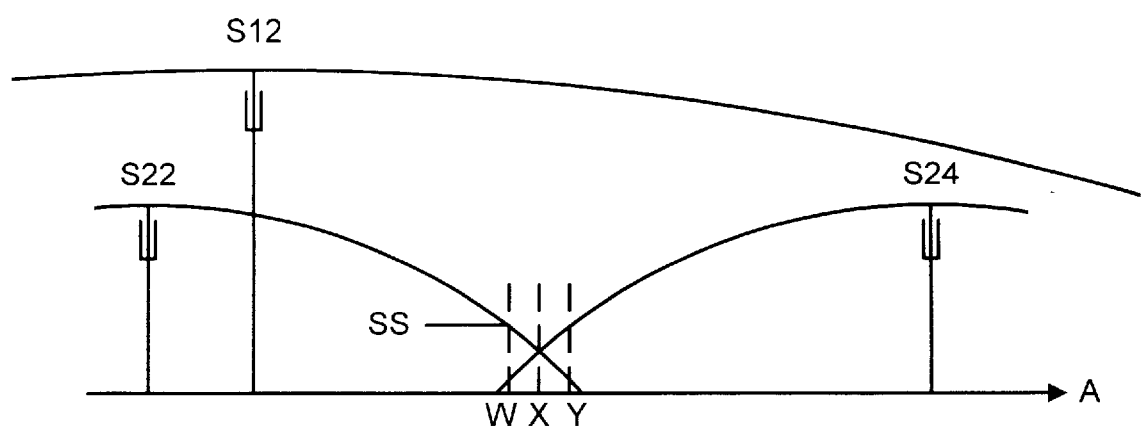
FIG. 2 is a schematic illustration of variations in signal strength along the path of travel of a mobile device.

In FIG. 2, the line A represents the path of a mobile device, being carried from building 18 to building 20, that is, from the picocell served by base station 22 into the picocell served by base station 24.

In FIG. 2, the heights of the lines S12, S22 and S24 above the line A indicate the strengths of signals receivable by the mobile device for the base stations 12, 22 and 24 respectively, at the relevant points on the line A. The line SS represents a threshold signal strength.

As described above, it is more efficient for traffic to be handled by picocells, where these are available. Therefore, as the mobile device is within range of the base station 22, at the starting point at the left hand end of line A, it is in communication with the base station 22. At all times, the mobile device is making signal strength measurements on all three channels, and is reporting the results to the base station and thence to the base station controller (step 200 in FIG. 3). As the mobile device moves to the right along line A, the signal strength S22 starts to reduce, until such time as it falls below the threshold level SS, when the mobile device reaches the point W on line A. At this point, it is determined (in step 100) that the need for a handover may be imminent.

Although such a determination is made in this illustrated embodiment when the detected signal strength falls below a threshold, the determination that a handover may be imminent may alternatively be made if the signal strength is falling at a rate which exceeds a threshold; if the path loss to the base station exceeds a threshold; if the path loss to the base station is increasing at a rate which exceeds a threshold; if the distance of the mobile station from the base station exceeds a preset maximum; or any convenient combination of these parameters.

As mentioned above, while it is operational, the mobile device is making signal strength measurements on a number of the channels which are available in the network. The results of these signal strength measurements are transmitted to the base station with which the mobile device is in communication, and are then reported back to the base station controller 26. Thus, at any time, the base station controller 26 has information regarding the other base stations with which the mobile device may be able to communicate.

Figure 3:
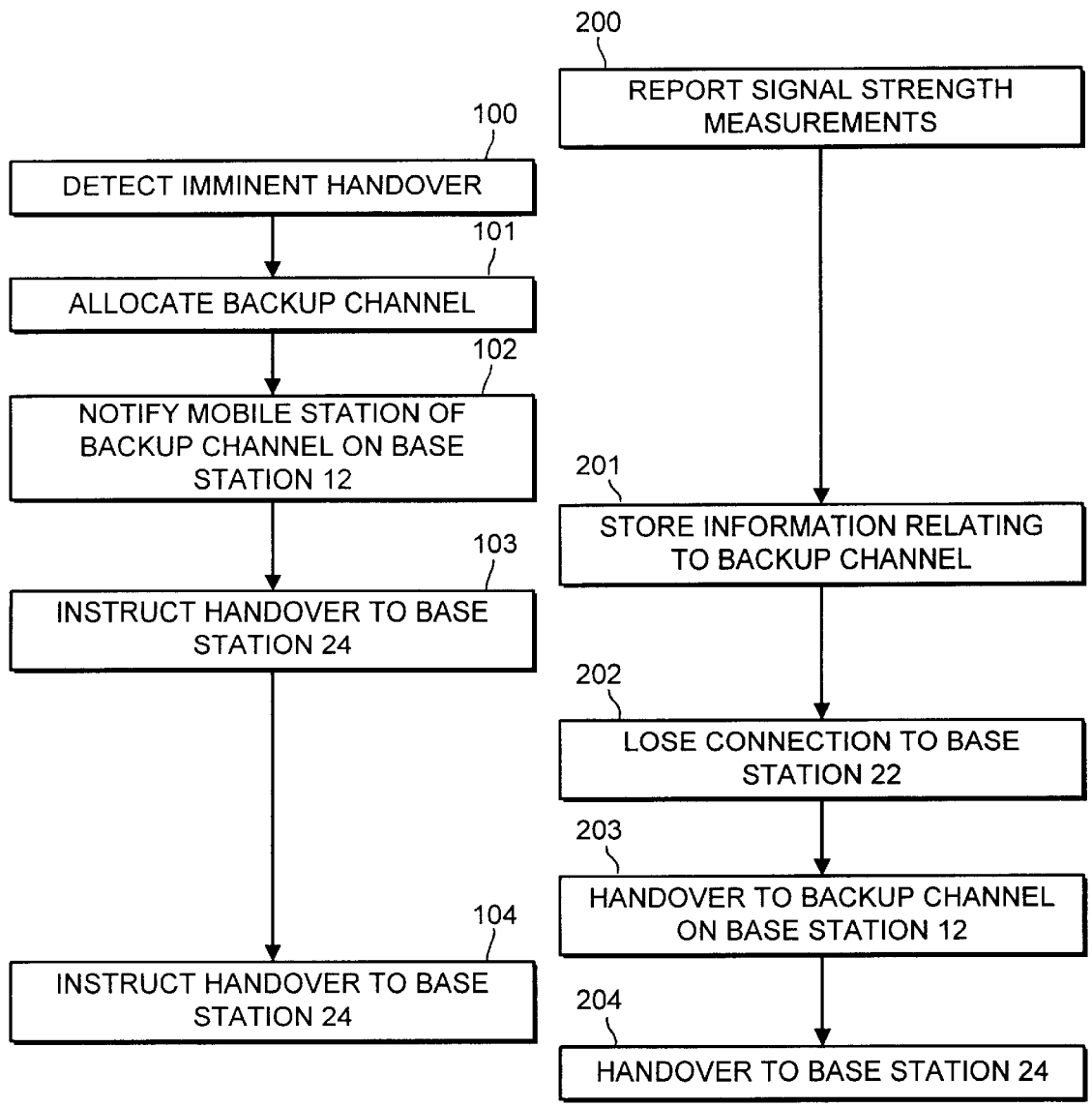
FIG. 3 is a flow chart illustrating the method carried out within the network in accordance with the invention.

In accordance with the invention, when the base station controller 26 determines that a handover to another picocell may be imminent, it allocates a backup channel to the mobile device (step 101 in FIG. 3). For example, the backup channel may be a channel in a cell in the layer above the cell with which the mobile device is communicating. Thus, here, where the mobile device is in communication with a base station in the picocell layer, it may be allocated a backup channel in the microcell layer. As a result of the signal strength measurements made by the mobile device, and reported to the base station controller 26, the base station controller will be able to determine that communication with the base station 12 is possible.

A message regarding the backup channel is transmitted from the base station 22 to the mobile device (step 102) shortly after allocation, at a time while the signal strength for such communications means that there is a very high probability that the message can be transmitted satisfactorily. The information about the backup channel is stored in the mobile device (step 201). The message transmitted to the mobile device preferably also contains an indication as to the length of time for which the backup channel will remain allocated to the mobile device. The mobile device contains a timer and, if that length of time elapses without the backup channel being used, the information about the backup channel is erased from the mobile device.

As the mobile device continues along the line A, it reaches point X, when the base station controller 26 is able to determine from the signal strength measurements made by the mobile device that the connection should handover to the base station 24. At this time, the base station controller 26 directs the base station 22 to transmit a message to the mobile device, instructing it to handover (step 103). If the handover message is correctly detected, then handover can occur. However, when the mobile device has reached point X, the signal strength is already relatively low (it is inefficient to build base stations too close together, or to operate base stations with transmission power levels which mean that signal strengths are high in the areas of overlap between the cells), and the signal strength is falling relatively quickly. As a result, there is a noticeable probability that the handover message will not be correctly detected in the mobile device. In the event that the message is not correctly detected, the mobile device remains connected to the base station 22. There is then a further opportunity for the base station controller 26 to direct the base station 22 to send further handover messages to the mobile device, until one such message is correctly detected. However, because of the decreasing signal strength, there is a possibility that no handover message will be correctly detected by the mobile device.

In this event, the mobile device remains in communication with the base station 22 until such time as it reaches the point Y, when the signal strength S22 has fallen to a point at which the mobile device can no longer communicate with the base station 22 (step 202). In a conventional system, the mobile device would at this point lose all contact with the network, and the call would be forcibly terminated. However, in accordance with the invention, the mobile device at this point accesses the backup channel in cell 16 through base station 12 (step 203 in FIG. 3). The establishment of communications on the backup channel is identical to the establishment of communications with a new base station in an ordinary handover procedure.

Handover to the backup channel may also be required when the mobile device correctly detects and decodes the handover message from the original base station, but fails to access the new base station indicated in the handover message, and then fails to reconnect to the original base station. The availability of a backup channel in a higher level may also be useful when a mobile device is approaching the outer edge of a network of lower level cells, but is for some reason unable to make the indicated handover to a cell in an upper level.

Returning to FIGS. 2 and 3, as the mobile device continues from point Y along line A, the base station controller 26 in step 104 again instructs the mobile device to handover communications to base station 24, on the principle discussed previously that these lower level cells have precedence over the higher level cells, and the mobile device takes the necessary action in step 204.

It can therefore be seen that the presence of the backup channel on base station 12 has allowed the communication between the mobile station and the network to be maintained, whereas it would have been lost in a conventional network.

Although the allocation of backup channels to mobile devices which are already in communication with other base stations may mean that channels are not always used with the maximum efficiency, the system can retain the ability, in the event of congestion, to retake an allocated backup channel. Clearly, in such a case, where another mobile device requires the channel, to allow it to communicate with the network at all, it is preferable, in terms of the overall quality of service, not to allocate the channel as a backup channel, merely as a precaution.

There is thus disclosed a system which allows the percentage of dropped calls in a network to be reduced, and which is of particular value in a microcell network, where rapidly changing signal strengths and narrow areas of overlap between cells may mean that handover messages are less likely to be detected correctly.

What is claimed is:

1. A method of managing a handover in a mobile communications system comprising a plurality of base stations associated with respective cells and a plurality of mobile stations, in which a mobile station is in communication with a first base station in a first cell on a first channel, the method comprising:

detecting that the mobile station is approaching an edge of the first cell;

allocating a second channel in a second cell to the mobile station;

determining that the mobile station should handover communications to a third channel in a third cell; and if the mobile station fails to handover communications to the third channel in the third cell, beginning communications with the mobile station on the second channel.

2. A method of managing a handover as claimed in claim 1, wherein the second cell is at a higher level than the first cell.

3. A method of managing a handover as claimed in claim 2, wherein the second cell is at a level immediately higher than the level of the first cell.

4. A method of managing a handover as claimed in claim 2, wherein the first cell is a micro cell, and the second cell is a macro cell.

5. A method of managing a handover as claimed in claim 1, comprising detecting that the mobile station is approaching an edge of the first cell by determining that the signal strength on the first channel has fallen below a predetermined threshold.

6. A method of managing a hangover as claimed in claim 1, comprising detecting that the mobile station is approaching an edge of the first cell by determining that the rate at which signal strength on the First channel is falling exceeds a predetermined threshold.

7. A method of managing a handover as claimed in claim 1, comprising detecting that the mobile station is approaching an edge of the first cell by determining that the path loss on the first channel has exceeded a predetermined threshold.

8. A method of managing a handover as claimed in claim 1, comprising detecting that the mobile station is approaching an edge of the first cell by determining that the rate at which path loss on the first channel is rising exceeds a predetermined threshold.

9. A method of managing a handover as claimed in claim 1, comprising detecting that the mobile station is approaching an edge of the first cell by determining that the distance of the mobile station from the first base station exceeds a predetermined threshold.

10. A method of managing a handover of a mobile device from a first base station to a second base station in a first lower layer of a cellular communications network, the method comprising:

determining that a handover may be imminent;

allocating a reserve channel in a second higher layer to the mobile device;

if required, instructing the mobile device to handover to the second base station; and if the handover is unsuccessful, communicating with the mobile device over the reserve channel.

11. A method of managing a handover as claimed in claim 10, comprising detecting that the mobile station is approaching an edge of the first cell by determining that the signal strength on the first channel has fallen below a predetermined threshold.

12. A method of managing a handover as claimed in claim 10, comprising detecting that the mobile station is approaching an edge of the first cell by determining that the rate at which signal strength on the first channel is falling exceeds a predetermined threshold.

13. A method of managing a handover as claimed in claim 10, comprising detecting that the mobile station is approaching an edge of the first cell by determining that the path loss on the first channel has exceeded a predetermined threshold.

14. A method of managing a handover as claimed in claim 10, comprising detecting that the mobile station is approaching an edge of the first cell by determining that the rate at which path loss on the first channel is rising exceeds a predetermined threshold.

15. A method of managing a handover as claimed in claim 10, comprising detecting that the mobile station is approaching an edge of the first cell by determining that the distance of the mobile station from the first base station exceeds a predetermined threshold.

16. A base station controller, for use in a cellular communications network, having a first base station and a second base station in a first lower layer and a third base station in a second higher layer, the first, second and third base stations operating on first, second and third channels respectively, and the controller comprising:

means for receiving signal strength measurements from a mobile device communicating with the first base station on the first channel;

means for determining from the received signal strength measurements a handover may be imminent;

means for allocating the third channel to the mobile device as a reserve channel;

if required, instructing the mobile device to handover to the second base station; and if the handover is unsuccessful, communicating with the mobile device over the reserve channel.

17. A mobile communications device, for use in a cellular communications network, the device comprising:

a transceiver, for communicating with a designated base station on a designated channel;

means for making signal strength measurements, and for reporting those measurements to the designated base station;

means for receiving channel assignments, including handover instructions;

means for determining whether an existing connection with a base station can be maintained;

means for storing details of a backup channel allocated to the mobile device; and if it is determined that an existing connection with a base station cannot be maintained, but no handover instruction has been received, means for handing over to the backup channel.

18. A mobile communications device as claimed in claim 17, wherein the means for storing details of the backup channel is controlled by a timer to store said details for a predetermined time period.

19. A cellular communications network comprising:

a first cell including a first base station;

a second cell including a second base station;

a third cell including a third base station, wherein the third cell includes the first and second cells;

means for detecting that a mobile device is going to handover from the first cell to the second cell;

means for allocating a channel in the third cell to the mobile device;

means for notifying the mobile device of the allocation of the channel;

means for instructing the mobile device to handover from the first cell to the second cell; and means for performing handover to the channel in the third cell if the mobile device fails to access the second base station and fails to reconnect to the first base station.

20. The cellular communications system of claim 19, wherein the first and second cells are microcells and the third cell is a macrocell.

* * * * *